UNITED STATES PATENT OFFICE.

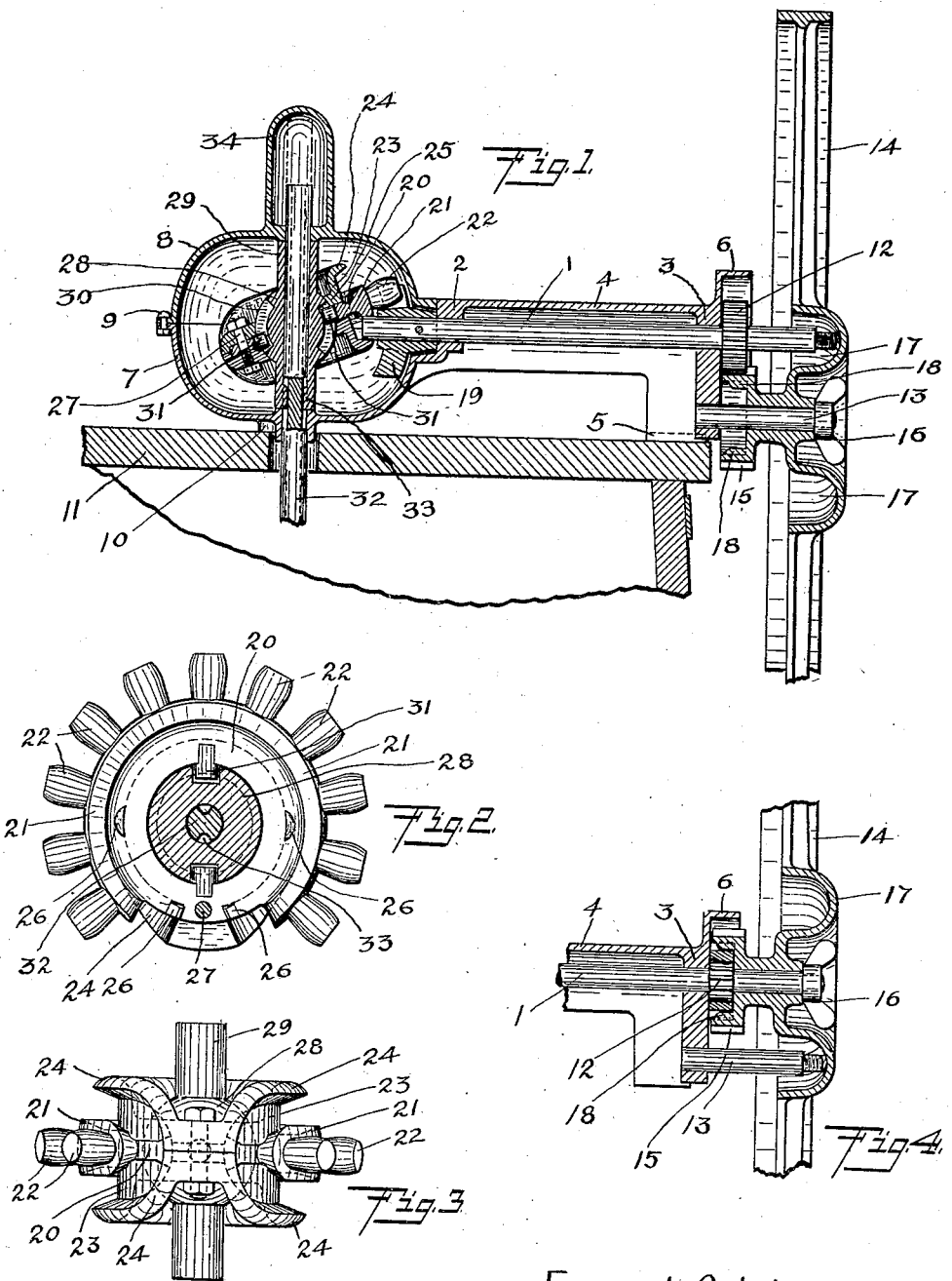

EMANUEL OEHRLE, OF OMAHA, NEBRASKA, ASSIGNOR OF ONE-THIRD TO FRANK R. HEFT, OF OMAHA, NEBRASKA.

MECHANICAL MOVEMENT.

No. 863,430.  Specification of Letters Patent.  Patented Aug. 13, 1907.

Application filed August 28, 1906. Serial No. 332,388.

*To all whom it may concern:*

Be it known that I, EMANUEL OEHRLE, a citizen of the United States, and a resident of Omaha, in the county of Douglas and State of Nebraska, have invented certain new and useful Improvements in Mechanical Movements, of which the following is a specification.

My invention relates to mechanical movements for converting continuous rotary motion into alternate or periodically reversed rotary motion.

It is the object of my invention to provide a mechanism of this class, especially adapted to use in washing machines, in which the driving shaft may be either geared or direct-connected with the driving pulley or flywheel, in which the parts of the reversing mechanism may be few in number, easily assembled and cast to exact form so that no machine work will be required thereon before assembling, in which the reversal of motion of the driven shaft is made smoothly and easily, in which longitudinal movement of the driven shaft is permitted, and in which the moving parts are covered or shielded to prevent articles of clothing or the like from catching therein.

Constructions embodying my invention are shown in the accompanying drawings in which Figure 1 is a sectional view of the mechanism, the section being on the axes of the driving and driven shafts, Fig. 2 is a detail plan view of the segmental pin-gear with the upper track-forming portion removed and showing a transverse section of the spherical body on the driven sleeve, Fig. 3 is a detail side elevation of the complete reversing gear and driven sleeve, and Fig. 4 is a detail section showing the direct connection of the driving shaft and the fly-wheel, the geared connection thereof being shown in Fig. 1.

In the construction shown the horizontal driving shaft 1 is journaled in suitable bearings 2 and 3 formed in an integral frame comprising, in addition to the said bearings 2 and 3, an inverted U-shaped portion 4 connecting said bearings and covering the driving shaft between the same, the foot portions 5 and the gear shield 6 adjacent the bearing 3, and adjacent the bearing 2 the hollow semi-globular portion 7 forming the lower part of the casing for the reversing gear. A hollow semi-globular cover 8 is secured above the portion 7 by small bolts 9, as shown. When used as a driving mechanism for washing machines, the foot portions 5 of the frame, and the lugs 10 on the lower side of the portion 7, rest on and are secured to the top of the machine cover 11, the globular casing resting over an opening in the said cover and the end of the frame at the bearing 3 extending slightly over the edge of the cover, as shown in Fig. 1.

On the driving shaft 1 adjacent the bearing 3 is a gear pinion 12, the shaft extending outside said pinion and the end thereof being shouldered and threaded, as shown. In the frame below the bearing 3 is secured a stud 13 which extends out parallel with the driving shaft and is of the same length outside the frame as the driving shaft, being shouldered and threaded in like manner. The hub of the fly-wheel or driving pulley 14 is provided with a gear 15 which has external teeth adapted to engage and drive the pinion 12 when the hub of the wheel 14 is placed upon the stud 13 as shown in Fig. 1. The hub is retained upon the stud by means of the thumb nut 16 screwed on the threaded end of the stud. Adjacent the hub of the wheel the same is provided with an annular recess 17 into which the end of the shaft 1 may extend, as shown. The inner side of the gear 15 has a cylindrical recess therein large enough to permit the same to pass over the pinion 12. Extending into said recesss are lugs 18 adapted to pass between the teeth of the pinion 12 when the wheel hub is placed on the shaft 1 as shown in Fig. 4. Thus, with the wheel hub in the latter position, the shaft 1 is driven directly therefrom, the stud 13 extending into the annular recess 17 as shown.

Near the inner end of the driving shaft, inside the globular casing formed by the portions 7 and 8, is secured the pinion 19, the teeth of which are of suitable form for engagement with the reversing gear. The said reversing gear comprises a central annular plate 20 having around a portion thereof the rim 21 on which are carried the radially extending pins 22, and the two cylindrical portions 23 disposed above and below the plate 20 and having thereon the outwardly extending track-forming flanges 24 and the inwardly extending flanges 25, the three parts being held in alinement by the guide lugs 26 on the plate 20 and being secured together by a single bolt 27, placed as shown. The inwardly extending flanges 25 on the cylindrical portions 23 fit over the spherical body 28 on the sleeve 29. In said spherical body 28 are meridional grooves 30 into which extend the pins 31 carried by and integral with the plate 20. Thus the reversing gear may be tilted to an inclined position relative to the axis of the sleeve 29, as shown in Fig. 1, but any rotary movement of the gear is transmitted to the sleeve by the pin and groove connection. The outwardly extending flanges 24 on the cylindrical portions 23, and the rim 21, form between the same an endless groove or trackway surrounding the pin-gear segment, the said flanges 24 curving axially around the ends of the rim 21, as shown in Fig. 3, so that the upper and lower track portions are joined at each end by the axially curved track portions shown in said Fig. 3. The inner end of the driving shaft 1 extends into said endless trackway, as shown, thereby holding the pin-gear segment at all times in engagement with the pinion 19.

The ends of the sleeve 29 bear against bosses on the inside of the casing portions 7 and 8, and through said sleeve passes the shaft 32. The said shaft has formed therein longitudinally extending grooves or keyways which are engaged by the lugs 33 in the core of the sleeve. The lower end of the shaft 32 extends down through the machine cover 11 and any suitable agitating or rubbing devices may be attached thereto. The upper end of the shaft 32, after passing through the cover 8, extends up into a hood 34 on top of the cover and integral therewith, as shown. The said shaft 32 holds the sleeve in vertical position within the globular casing and all rotary movement of the sleeve is transmitted to the shaft by the slidable connection between the parts.

In the operation of the reversing gear, the driving shaft being rotated in either direction will turn the reversing gear until the last pin of the pin-gear segment engages the pinion 19. The said pin will then be carried around the pinion, being held in mesh therewith by the engagement of the end of the shaft 1 with the axially curved portion of the endless trackway. As the pin is carried around the pinion the reversing gear is tilted on the spherical body 28 and at the end of the tilting movement the pinion again engages the other pins of the segment driving the same in the reverse direction until the end of the segment is reached, when the direction of movement is again reversed, as described.

It will be noted that by the means described the reversal of movement will be made smoothly and easily, that all parts of the reversing mechanism may be easily and cheaply made and assembled, and that all moving parts of the mechanism, except the flywheel 14, are covered or shielded so as to prevent articles of clothing or the like being caught thereby. The variation of speed made by changing the wheel 14 from the stud 13 to the driving shaft, thus making either a geared or direct-connected drive, as described, enables the mechanism to be used to best advantage for either a light or heavy load.

Now, having described my invention, what I claim and desire to secure by Letters Patent is:—

1. In a mechanical movement of the class described, a driving shaft journaled in fixed bearings, a pinion carried thereby, a segmental pin-gear engaged by said pinion, cylindrical bodies secured on each side of the pin-gear, there being outwardly extending flanges on said bodies forming an endless trackway surrounding said pin-gear segment, the end of the driving shaft entering said trackway, there being inwardly extending flanges on said cylindrical bodies, a rotatable spherical body partly inclosed by said inwardly extending flanges, and means connecting said pin-gear with the said spherical body by which the body may be rotated but permitting a meridional tilting of the gear relative to the axis of rotation of the spherical body.

2. In a mechanical movement of the class described, a driving shaft journaled in fixed bearings, a driven shaft disposed substantially at right angles to the driving shaft, a rotatable sleeve held adjacent the end of the driving shaft, the driven shaft passing through said sleeve and having a slidable connection therewith, there being a spherical body on the said sleeve, a segmental pin-gear having portions partly inclosing said spherical body, means connecting the pin-gear and spherical body to cause coincident rotary movement thereof but permitting meridional tilting of the gear relative to the axis of rotation of the body, a pinion carried by the driving shaft and engaging the pin-gear segment, and cylindrical bodies secured on each side of the pin-gear, there being outwardly extending flanges on said cylindrical bodies forming a trackway surrounding the said segment, and the end of the driving shaft entering said trackway to retain the segment in mesh with the pinion.

3. In a mechanical movement of the class described, a driving shaft, a pinion carried thereby, a fixed stud disposed parallel with the shaft and adjacent the end thereof carrying the pinion, a fly-wheel having a hub adapted to pass over and be retained upon either the end of the driving shaft or the fixed stud, and a gear carried by said hub, said gear having external teeth adapted to mesh with the pinion on the driving shaft when the hub is placed on the fixed stud, and there being a recess in the gear adapting the same to pass over and fixedly engage the pinion when the hub is placed on the driving shaft.

4. In a mechanical movement of the class described, a driving shaft, a driven shaft disposed substantially at right angles with the driving shaft, a reversing gear mechanism connecting said shafts, a frome having therein bearings for the driving shaft, a portion connecting said bearings and covering said shaft, a globular casing inclosing the reversing gear mechanism, the driven shaft being longitudinally slidable through said reversing gear mechanism and the globular casing, and a hood carried by said globular casing and adapted to inclose the end of the driven shaft protruding from the globular casing.

In testimony whereof I have hereunto subscribed my name in the presence of two witnesses.

EMANUEL OEHRLE.

Witnesses:
F. R. HEFT,
D. O. BARNELL.